(12) United States Patent
Xiong et al.

(10) Patent No.: US 12,436,259 B2
(45) Date of Patent: Oct. 7, 2025

(54) METHODS AND SYSTEMS OF SCANNING MICROWAVE VIBRATION AND DEFORMATION MEASUREMENT

(71) Applicant: SHANGHAI JIAO TONG UNIVERSITY, Shanghai (CN)

(72) Inventors: Yuyong Xiong, Shanghai (CN); Zhike Peng, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/266,339

(22) PCT Filed: Aug. 18, 2022

(86) PCT No.: PCT/CN2022/113245
§ 371 (c)(1),
(2) Date: Jun. 9, 2023

(87) PCT Pub. No.: WO2023/201941
PCT Pub. Date: Oct. 26, 2023

(65) Prior Publication Data
US 2024/0151842 A1    May 9, 2024

(30) Foreign Application Priority Data

Apr. 22, 2022 (CN) .......................... 202210428888.3

(51) Int. Cl.
*G01S 13/42* (2006.01)
*G01S 7/28* (2006.01)
(Continued)

(52) U.S. Cl.
CPC .......... *G01S 13/426* (2013.01); *G01S 7/2813* (2013.01); *G01S 7/352* (2013.01); *G01S 13/342* (2013.01)

(58) Field of Classification Search
CPC ...... G01S 13/426; G01S 7/2813; G01S 7/352; G01S 13/342
See application file for complete search history.

(56) References Cited

U.S. PATENT DOCUMENTS 10,809,365 B2 * 10/2020 Patole ..................... G01S 13/36
2010/0152600 A1 6/2010 Droitcour et al.
(Continued)

FOREIGN PATENT DOCUMENTS

| CN | 102313885 A | 1/2012 |
| CN | 103068304 A | 4/2013 |

(Continued)

OTHER PUBLICATIONS

18266339_2025-06-15_CN_113253234_A_M.pdf, machine translation of CN-113253234-A (Year: 2021).*

(Continued)

*Primary Examiner* — William Kelleher
*Assistant Examiner* — Kenneth W Good
(74) *Attorney, Agent, or Firm* — Bayramoglu Law Offices LLC

(57) ABSTRACT

A scanning method and system for measuring microwave vibration and deformation include simultaneously transmitting linear-frequency-modulation continuous waves by using a plurality of transmit antennas and enabling a main lobe of a synthesized beam to be directed towards a specific angle direction; receiving echoes by using a plurality of receive antennas to obtain vibration and deformation displacement values of a single target or multiple targets in an angle direction 1 of a cycle; through the phase shift control on the plurality of transmit antennas, extracting vibration and deformation displacement values of a single target or multiple targets in an angle direction 2 of the cycle based on the foregoing method; according to a measurement require- (Continued)

ment, measuring and extracting vibration and deformation displacement values of a single target or multiple targets in another angle direction of the cycle; and obtaining vibration and deformation displacement time sequence values of all scanned points.

15 Claims, 10 Drawing Sheets

(51) Int. Cl.
*G01S 7/35* (2006.01)
*G01S 13/34* (2006.01)

(56) References Cited

U.S. PATENT DOCUMENTS

| | | | | |
|---|---|---|---|---|
| 2013/0001422 | A1* | 1/2013 | Lavon | G01S 13/42 250/393 |
| 2019/0324134 | A1* | 10/2019 | Cattle | G01S 7/024 |
| 2020/0370879 | A1* | 11/2020 | Mutlu | G06F 3/017 |
| 2022/0187158 | A1 | 6/2022 | Peng et al. | |
| 2023/0136937 | A1* | 5/2023 | Cheng | A63B 24/0062 342/194 |

FOREIGN PATENT DOCUMENTS

| | | | | |
|---|---|---|---|---|
| CN | 106644030 | A | 5/2017 | |
| CN | 108387892 | A | 8/2018 | |
| CN | 111327371 | A | 6/2020 | |
| CN | 112747877 | A | 5/2021 | |
| CN | 112924961 | A | 6/2021 | |
| CN | 113253234 | A * | 8/2021 | ............... G01B 7/16 |
| CN | 113624374 | A | 11/2021 | |
| CN | 114114234 | A * | 3/2022 | ........... G01S 13/584 |
| CN | 115824104 | A | 3/2023 | |
| CN | 115931269 | A | 4/2023 | |

OTHER PUBLICATIONS

18266339_2025-06-15_CN_114114234_A_M.pdf, machine translation of CN-114114234-A (Year: 2022).*
Qi Yao-Long, et al., Digital Beam Forming Algorithm for Ground-based Radar Imaging Processing, Journal of Signal Processing, 2015, pp. 1313-1317, vol. 31 No. 10.
Xiong Yuyong, et al., Dynamic response monitoring of flexible structures based on microwave sensing, Journal of Vibration and Shock, 2020, pp. 277-282, vol. 39, No. 15.
Yuyong Xiong, et al., Full-field 3D displacement measurement via microwave sensing, Mechanical Systems and Signal Processing, 2025, pp. 1-16, vol. 234.
Xiong Yuyong, et al., Theory and method of multi-point synchronous deformation and vibration measurement based on millimeter-wave sensing, Scientia Sinica Technologica, 2021, pp. 998-1010, vol. 51, No. 9.

* cited by examiner

METHODS AND SYSTEMS OF SCANNING MICROWAVE VIBRATION AND DEFORMATION MEASUREMENT

CROSS-REFERENCES TO THE RELATED APPLICATIONS

This application is the national phase entry of International Application No. PCT/CN2022/113245, filed on Aug. 18, 2022, which is based upon and claims priority to Chinese Patent Applications No. 202210428888.3, filed on Apr. 22, 2022, the entire contents of which are incorporated herein by reference.

TECHNICAL FIELD

The present invention relates to the technical field of vibration and deformation measurement, in particular to a scanning method and system for measuring microwave vibration and deformation.

BACKGROUND

Vibration phenomena are ubiquitous in nature and engineering. The measurement of vibration and deformation provides crucial sensing data for mechanical testing, dynamic behavior observation, deformation evolution identification, and the like of engineering equipment and structures, having important value for engineering application. The measurements are mainly classified into contact measurement and non-contact measurement according to different measurement methods. The non-contact measurement has obvious advantages in engineering practice because no sensors need to be mounted on the inspected object in such method. At present, measurement is mainly implemented based on vision and laser, but measurement performance and environmental adaptability are limited greatly. A new type of vibration and deformation measurement technology based on microwave sensing has been applied to measure small and large vibration and deformation. In addition, the premise of performing microwave vibration measurement technology is the reflection or strong scattering of electromagnetic waves by the inspected target, and therefore for obtaining of better signal strength and improvement of multi-points for inspection recognition ability, aiming targets such as corner reflectors usually need to be arranged. However, problems are particularly prominent in the multi-point and full-field measurement of the surface targets. Moreover, in actual engineering measurement, the inspected object cannot be mounted with aiming targets such as corner reflectors, resulting in a low signal-to-noise ratio of the measurement and poor resolution of multiple points for inspection or even the failed measurement. Therefore, how to implement multi-point and full-field measurement on microwave vibration and deformation with high signal-to-noise ratio and no aiming targets has become a problem to be resolved urgently and also a goal pursued by persons in this technical field.

To implement displacement measurement on multiple points or points in full field with effective identification and resolution, the existing microwave vibration and deformation measurement technology needs aiming targets such as corner reflectors to be pasted or mounted. This brings additional mass during the measurement, affecting intrinsic dynamic characteristics and further causing inconvenience to the measurement due to the mounting and fixing of the aiming targets. In addition, in the existing technology, a large number of transceiver channels are needed to achieve high angular resolution, and there are also major difficulties in the suppression of coupling clutter interference between points for inspection and the implementation of measurement with a high signal-to-noise ratio.

Therefore, it is necessary to provide a new technical solution so as to resolve the foregoing technical problem.

SUMMARY

Aiming at the defects in the related art, an objective of the present invention is to provide a scanning method and system for measuring microwave vibration and deformation.

A scanning method and system for measuring microwave vibration and deformation provided by the present invention includes the following steps:

step S1: simultaneously transmitting linear-frequency-modulation continuous waves by using a plurality of transmit antennas, performing phase shift control on transmit signals of the plurality of transmit antennas, and enabling a main lobe of a synthesized beam to be directed towards a measured specific angle direction;

step S2: receiving echoes by using a plurality of receive antennas to obtain multi-channel baseband signals, and performing non-linear demodulation processing on the acquired multi-channel baseband signals to obtain vibration and deformation displacement values of a single target or point for inspection in an angle direction 1 of a cycle or obtain vibration and deformation displacement values of a plurality of targets or points for inspection in the angle direction 1 of the cycle;

step S3: offsetting an angle of the main lobe of the synthesized beam through the phase shift control on the plurality of transmit antennas, and extracting vibration and deformation displacement values of a single target or point for inspection in an angle direction 2 of the cycle based on the foregoing method or vibration and deformation displacement values of a plurality of targets or points for inspection in the angle direction 2 of the cycle; according to a measurement requirement, measuring and extracting vibration and deformation displacement values of a single target or point for inspection in another angle direction of the cycle or measuring and extracting vibration and deformation displacement values of a plurality of targets or points for inspection in the another angle direction of the cycle; and step S4: according to the foregoing scanning method, at intervals of a specific cycle time, measuring vibration and deformation through circular scanning in angle directions, to obtain vibration and deformation displacement time sequence values of all scanned points or targets for inspection.

Further, in step S1, the performing phase shift control on transmit signals of the plurality of transmit antennas is completed through the following method:

if an angle of a target or point for inspection in a microwave front-end radiating wave is set to $\theta_0$, controlling phase shifts of antennas in the transmit antenna array respectively to be $0, 2\pi d_2 \sin\theta_0/\lambda_c, \ldots$, and $2\pi d_K \sin\theta_0/\lambda_c$, a first antenna being taken as a reference point, where $d_k$ ($k=2, \ldots N$) represents a distance between a $k^{th}$ transmit antenna and the first transmit antenna, and $\lambda_c$ represents a wavelength corresponding to a linear-frequency-modulation continuous-wave center frequency; and arranging the transmit antenna array at equal spacing or at unequal spacing sparsely, where the transmit antenna array is arranged horizontally during scanning at a horizontal angle, the transmit antenna array is arranged vertically during scanning at a pitching angle, and the transmit antenna array is arranged both horizontally and vertically during scanning at a spatial angle.

Further, the scanning angle and distribution are determined according to a measurement requirement or a spatial arrangement of the point or target for inspection.

Further, the scan angle direction required in steps S1 to S3 is obtained according to prior knowledge, the measurement requirement, or initial locating information of points for inspection in full field.

Further, in steps S2 to S4, a non-linear demodulation method of extracting vibration and deformation displacement values of a single target or point for inspection or a plurality of targets or points for inspection in a specific scan-cycle angle direction includes the following steps:

calculating, by means of the following formula, a vibration and deformation displacement sequence element value $x(p,\theta_s,R)$, extracted through the non-linear demodulation method, of an inspected target or point in a current scan cycle:

$$x(p, \theta_s, R, iT_{sweep}) = \arg\left\{\sum_{m=1}^{M}\sum_{n=0}^{N-1} s_B(p, \theta_s, iT_{sweep}, nT_s)\exp[-j(2\pi \tilde{f}_R nT_s)]\exp\left[-j\left(2\pi \frac{d_{rxm}\sin\theta_s}{\lambda_c}\right)\right]\right\}$$

$$\lambda_c/4\pi$$

where $x(p,\theta_s,R,iT_{sweep})$ represents a displacement sequence element value of a target or point for inspection at a current scan angle distance of R during a pth circular scan with a beam scan angle of $\theta_s$ and a transmit sweep cycle of i, $T_{sweep}$ represents a sweep cycle of a transmit antenna transmitting a linear-frequency-modulation continuous wave, arg[•] represents calculation for a complex phase value, N represents a quantity of single-channel baseband signal elements in each sweep cycle, n represents a serial number of a single-channel baseband signal element in each sweep cycle, and $T_s$ represents a baseband signal sampling frequency time; and $s_B(p,\theta_s,iT,nT_s)$ represents a matrix formed by m channel baseband signals in the ith transmit sweep cycle during a pth circular scan at a beam scan angle of $\theta_s$, a column vector of the matrix is a baseband signal of a m=1, 2, . . . , Mth channel, j represents an imaginary number unit, $\tilde{f}_R$ represents a beat-frequency estimated value corresponding to a distance of the inspected target or point, and $d_{rxm}$ (m=1, . . . , M) respectively represent distances between m receive antennas and the first receive antenna, where $d_{rx1}=0$, and $\lambda_c$ represents a wavelength corresponding to the linear-frequency-modulation continuous-wave center frequency; and a quantity i of transmit sweep cycles at each scan angle is equal to 1 or a positive integer greater than 1, and when the quantity is greater than 1, according to a requirement, the sequence element value $x(p,\theta_s,R)$ is an average or optimal value or another selected value of sequences of $x(p,\theta_s,R,iT_{sweep})$ in a plurality of transmit sweep cycle times in the current scan cycle.

Further, the circular scan method in step S4 includes the following steps:

according to a measurement requirement, sequentially changing the scan angle $\theta_s$ through the phase shift control, where s=0, 2, . . . , a positive integer of S−1, and according to the foregoing method, extracting vibration and deformation displacement element values of all targets or points for inspection in the scan range.

The preset invention further provides a scanning system for measuring microwave vibration and deformation applying the scanning method for measuring microwave vibration and deformation. The system includes the following modules:

a microwave transceiver configured to simultaneously transmit linear-frequency-modulation continuous-wave microwave signals of a plurality of channels by using a transmit antenna array, receive echo signals, output multi-channel baseband signals, and circularly scan a synthesized beam through phase shift control of transmit antennas;

a control processor configured to control beam scanning by microwave transceiver, baseband signal acquisition, and extraction on vibration and deformation displacement of inspected targets or points; and a display and storage module configured to display or store system scan angle distribution, vibration and deformation displacement sequence values or waveforms of all inspected targets or points, and other intermediate processing information.

Further, the microwave transceiver includes a linear-frequency-modulation continuous-wave microwave signal source, a power divider, a frequency mixer, a phase shifter, an amplifier, a transmit antenna array, and a receive antenna array, where the signal source is connected to the power divider, having part connected to the phase shifter and radiating signal through a transmit antenna and the other part being taken as a local oscillator signal for mixing; the phase shifter is connected to the transmit antenna and configured to make, through phase shift regulation, a main lobe of the synthesized beam transmitted by the transmit antenna array directed towards a specific set scan angle; and the receive antenna array is connected to the amplifier, an outputted amplified signal is connected to the frequency mixer, mixed with a local oscillator signal at the frequency mixer, so as to output multi-channel baseband signals.

Further, the transmit antenna array is capable of being arranged horizontally, vertically, or both horizontally and vertically according to scanning requirements of a spatial attitude angle and pitching angle; a quantity of transmit antennas in the transmit antenna array needs to be greater than or equal to 2, and the transmit antennas are arranged at equal or unequal spacing; and a quantity of receive antennas in the receive antenna array needs to be greater than or equal to 1 and the receive antennas are arranged at equal or unequal spacing; and a quantity of phase shifters is equal to the quantity of transmit antennas and in addition to the phase shifter, a time delay line or another device with a phase shift control function may also be used for phase shift control.

Further, the control processor includes a scan control unit and a signal acquiring and processing unit, where the scan control unit is configured to control phase shift of the transmit antenna channel, control a circular scan cycle, and control other conventional parameters of the microwave transceiver; and the phase shift control is implemented through configuration of the phase shifter connected to each transmit antenna; and the signal acquiring and processing unit is configured to synchronously acquire multi-channel baseband signals and process the acquired baseband signals to extract vibration and deformation displacement values of the inspected target or point.

BRIEF DESCRIPTION OF DRAWINGS

Other characteristics, objects and advantages of the present invention will become more apparent upon reading the detailed description of non-limiting embodiments made with reference to the following drawings.

DETAILED DESCRIPTION OF EMBODIMENTS

Figure 1:
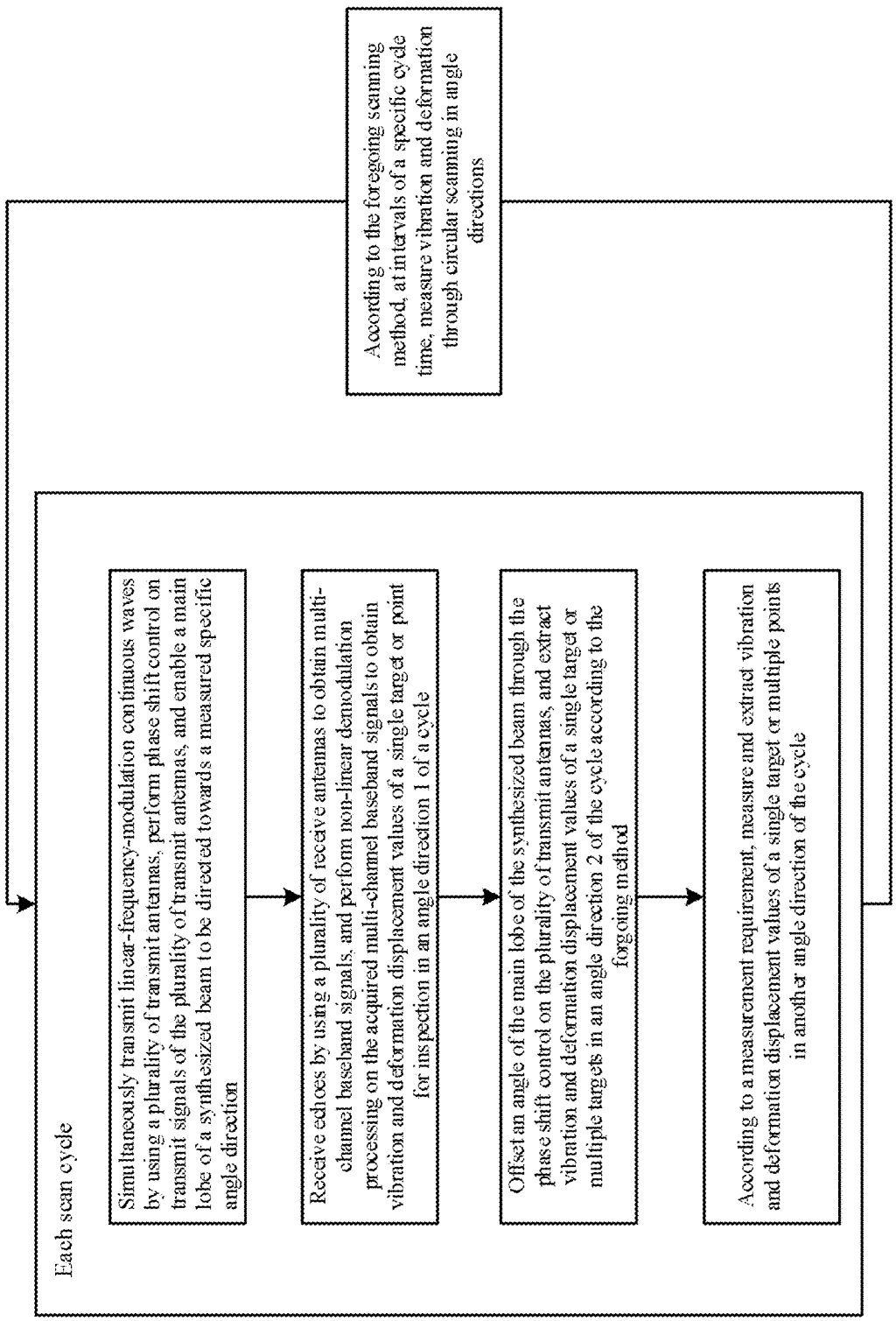
FIG. 1 is a flowchart of a scanning method for measuring microwave vibration and deformation according to an embodiment of the present invention.

The present invention is described in detail below with reference to specific embodiments. The following embodiments help those skilled in the art to further understand the present invention, but do not limit the present invention in any form. It should be noted that those skilled in the art can make various changes and improvements without departing from the concept of the present invention. These all shall fall into the protection scope of the present invention.

Embodiment 1

The present invention provides a scanning method for measuring microwave vibration and deformation, which includes the following steps:

Step S1: Simultaneously transmit linear-frequency-modulation continuous waves by using a plurality of transmit antennas, perform phase shift control on transmit signals of the plurality of transmit antennas, and enable a main lobe of a synthesized beam to be directed towards a measured specific angle direction.

The performing phase shift control on transmit signals of the plurality of transmit antennas is completed through the following method:

if an angle of a target or point for inspection in a microwave front-end radiating wave is set to $\lambda_0$, controlling phase shifts of antennas in the transmit antenna array respectively to be 0, $2\pi d_2 \sin\theta_0/\lambda_c, \ldots,$ and $2\pi d_K \sin\theta_0/\lambda_c$, a first antenna being taken as a reference point, where $d_k$ (k=2, ... N) represents a distance between a $k^{th}$ transmit antenna and the first transmit antenna, and $\lambda_c$ represents a wavelength corresponding to a linear-frequency-modulation continuous-wave center frequency; and arranging the transmit antenna array at equal spacing or at unequal spacing sparsely, where the transmit antenna array is arranged horizontally during scanning at a horizontal angle, the transmit antenna array is arranged vertically during scanning at a pitching angle, and the transmit antenna array is arranged both horizontally and vertically during scanning at a spatial angle.

Step S2: Receive echoes by using a plurality of receive antennas to obtain multi-channel baseband signals, and perform non-linear demodulation processing on the acquired multi-channel baseband signals to obtain vibration and deformation displacement values of a single target or point for inspection in an angle direction 1 of a cycle or obtain vibration and deformation displacement values of a plurality of targets or points for inspection in the angle direction 1 of the cycle.

step S3: Offset an angle of the main lobe of the synthesized beam through the phase shift control on the plurality of transmit antennas, and extract vibration and deformation displacement values of a single target or point for inspection in an angle direction 2 of the cycle based on the foregoing method or vibration and deformation displacement values of a plurality of targets or points for inspection in the angle direction 2 of the cycle; according to a measurement requirement, measure and extract vibration and deformation displacement values of a single target or point for inspection in another angle direction of the cycle or measure and extract vibration and deformation displacement values of a plurality of targets or points for inspection in the another angle direction of the cycle; and step S4: according to the foregoing scanning method, at intervals of a specific cycle time, measure vibration and deformation through circular scanning in angle directions, to obtain vibration and deformation displacement time sequence values of all scanned points or targets for inspection.

Further, the scanning angle and distribution are determined according to a measurement requirement or a spatial arrangement of the point or target for inspection.

The scan angle direction required in steps S1 to S3 is obtained according to prior knowledge, the measurement requirement, or initial locating information of points for inspection in full field.

In steps S2 to S4, a non-linear demodulation method of extracting vibration and deformation displacement values of a single target or point for inspection or a plurality of targets or points for inspection in a specific scan-cycle angle direction includes the following steps:

calculating, by means of the following formula, a vibration and deformation displacement sequence element value $x(p,\theta_s,R)$, extracted through the non-linear demodulation method, of an inspected target or point in a current scan cycle:

$$x(p, \theta_s, R, iT_{sweep}) =$$

$$\arg\left\{\sum_{m=1}^{M}\sum_{n=0}^{N-1} s_B(p, \theta_s, iT_{sweep}, nT_s)\exp[-j(2\pi \hat{f}_R nT_s)]\exp\left[-j\left(2\pi \frac{d_{rxm}\sin\theta_s}{\lambda_c}\right)\right]\right\}$$

$$\lambda_c/4\pi$$

where $x(p,\theta_s,R,iT_{sweep})$ represents a displacement sequence element value of a target or point for inspection at a current scan angle distance of R during a pth circular scan with a beam scan angle of $\theta_s$ and a transmit sweep cycle of i, $T_{sweep}$ represents a sweep cycle of a transmit antenna transmitting a linear-frequency-modulation continuous wave, arg[•] represents calculation for a complex phase value, N represents a quantity of single-channel baseband signal elements in each sweep cycle, n represents a serial number of a single-channel baseband signal element in each sweep cycle, and $T_s$ represents a baseband signal sampling frequency time; and $s_B(p,\theta_s,iT,nT_s)$ represents a matrix formed by m channel baseband signals in the ith transmit sweep cycle during a pth circular scan at a beam scan angle of $\theta_s$, a column vector of the matrix is a baseband signal of a m=1, 2, . . . , Mth channel, j represents an imaginary number unit, $\hat{f}_R$ represents a beat-frequency estimated value corresponding to a distance of the inspected target or point, and $d_{r\times m}$ (m=1, . . . , M) respectively represent distances between m receive antennas and the first receive antenna, where $d_{r\times 1}=0$, and $\lambda_c$ represents a wavelength corresponding to the linear-frequency-modulation continuous-wave center frequency.

In the forgoing non-linear demodulation calculation method, without changing the essence, another demodulation calculation formula may also be applied on this basis.

A quantity i of transmit sweep cycles at each scan angle is equal to 1 or a positive integer greater than 1, and when the quantity is greater than 1, according to a requirement, the sequence element value $x(p,\theta_s,R)$ is an average or optimal value or another selected value of sequences of $x(p,\theta_s,R, iT^{sweep})$ in a plurality of transmit sweep cycle times in the current scan cycle.

The circular scan method in step S4 includes the following steps:

according to a measurement requirement, sequentially changing the scan angle $\theta_s$ through the phase shift control, where s=0, 2, . . . , a positive integer of S−1, and according to the foregoing method, extracting vibration and deformation displacement element values of all targets or points for inspection in the scan range.

A scan angle of a target or point for inspection is set to $\theta_s$, and a distance to an antenna is set to R, such that the vibration and deformation displacement time sequence obtained finally is $[x(1,\theta_s,R), \ldots , x(p,\theta_s,R), \ldots ]$, where p=1, 2, . . . , P represents a circular scanning cycle number, and the time interval refers to the time used for one circular scan or to a circular scan cycle.

Taking the vibration and deformation displacement time sequence $[x(1,\theta_s,R), \ldots , x(p,\theta_s,R), \ldots ]$ of the forgoing specific target or point for inspection as an example, the general constant phase is processed as needed, for example, by subtracting the average value or the initial value of the sequence.

Embodiment 2

The preset invention further provides a scanning system for measuring microwave vibration and deformation applying the scanning method for measuring microwave vibration and deformation. The system includes the following modules:

a microwave transceiver configured to simultaneously transmit linear-frequency-modulation continuous-wave microwave signals of a plurality of channels by using a transmit antenna array, receive echo signals, output multi-channel baseband signals, and circularly scan a synthesized beam through phase shift control of transmit antennas, where the microwave transceiver includes a linear-frequency-modulation continuous-wave microwave signal source, a power divider, a frequency mixer, a phase shifter, an amplifier, a transmit antenna array, and a receive antenna array, where the signal source is connected to the power divider, having part connected to the phase shifter and radiating signal through a transmit antenna and the other part being taken as a local oscillator signal for mixing; the phase shifter is connected to the transmit antenna and configured to make, through phase shift regulation, a main lobe of the synthesized beam transmitted by the transmit antenna array directed towards a specific set scan angle; and the receive antenna array is connected to the amplifier, an outputted amplified signal is connected to the frequency mixer, mixed with a local oscillator signal at the frequency mixer, so as to output multi-channel baseband signals; and the transmit antenna array is capable of being arranged horizontally, vertically, or both horizontally and vertically according to scanning requirements of a spatial attitude angle and pitching angle; a quantity of transmit antennas in the transmit antenna array needs to be greater than or equal to 2, and the transmit antennas are arranged at equal or unequal spacing; a quantity of receive antennas in the receive antenna array needs to be greater than or equal to 1 and the receive antennas are arranged at equal or unequal spacing; and a quantity of phase shifters is equal to the quantity of transmit antennas and in addition to the phase shifter, a time delay line or another device with a phase shift control function may be also used for phase shift control;

a control processor configured to control beam scanning by microwave transceiver, baseband signal acquisition, and extraction on vibration and deformation displacement of inspected targets or points, where the control processor includes a scan control unit and a signal acquiring and processing unit, where the scan control unit is configured to control phase shift of the transmit antenna channel, control a circular scan cycle, and control other conventional parameters of the microwave transceiver; and the phase shift control is implemented through configuration of the phase shifter connected to each transmit antenna; and the signal acquiring and processing unit is configured to synchronously acquire multi-channel baseband signals and process the acquired baseband signals to extract vibration and deformation displacement values of the inspected target or point; and a display and storage module configured to display or store system scan angle distribution, vibration and deformation displacement sequence values or waveforms of all inspected targets or points, and other intermediate processing information.

Embodiment 3

Embodiment 3 is a preferred example of Embodiment 1 and Embodiment 2 to describe the present invention more specifically.

The present invention provides a scanning method for measuring microwave vibration and deformation. As shown in FIG. 1, linear-frequency-modulation continuous waves are transmitted simultaneously by using a plurality of transmit antennas, phase shift control is performed on transmit signals of the plurality of transmit antennas, and a main lobe of a synthesized beam is enabled to be directed towards a measured specific angle direction. In this case, echoes are received by using a plurality of receive antennas to obtain multi-channel baseband signals, and non-linear demodulation processing is performed on the acquired multi-channel baseband signals to obtain vibration and deformation displacement values of a single target (or a point for inspection) or multiple targets (or points for inspection) in an angle direction 1 of a cycle.

Then, an angle of the main lobe of the synthesized beam is offset through the phase shift control on the plurality of transmit antennas, and vibration and deformation displacement values of a single target (or a point for inspection) or multiple targets (or points for inspection) in an angle direction 2 of the cycle are extracted according to the forgoing method.

According to a measurement requirement, vibration and deformation displacement values of a single target (or a point for inspection) or multiple targets (or points for inspection) in another angle direction of the cycle are measured and extracted.

According to the foregoing scanning method, at intervals of a specific cycle time, vibration and deformation are measured through circular scanning in angle directions, to obtain vibration and deformation displacement time sequence values of all scanned points or targets for inspection.

Transmit antennas simultaneously transmit the synthesized beam of the linear-frequency-modulation continuous wave. The orientation angle of the main lobe is controlled through the following method: an angle of a microwave front-end radiation wave of the target or point for inspection is set to $\theta_0$ according to the prior knowledge, a measurement requirement, or initial locating information of microwave points for inspection in full field.

Figure 2:
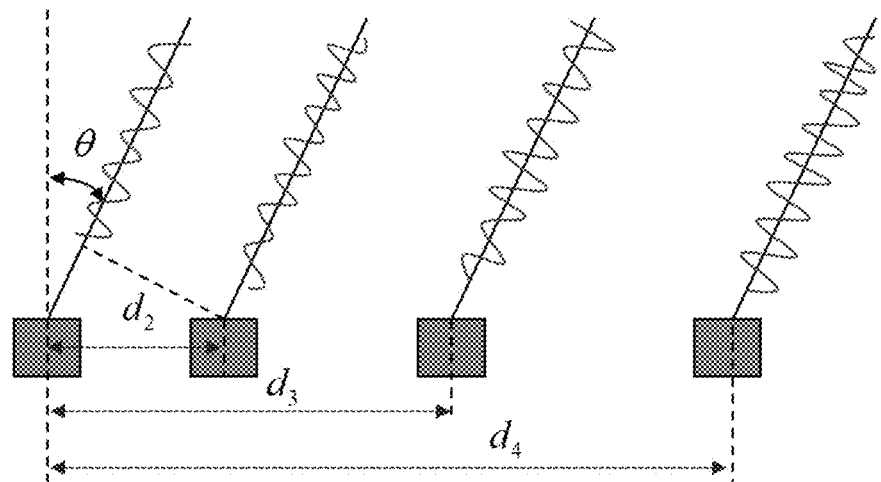
FIG. 2 is a schematic diagram of horizontal arrangement of a transmit antenna array and its phase shift control relationship according to an embodiment of the present invention.
Figure 3:
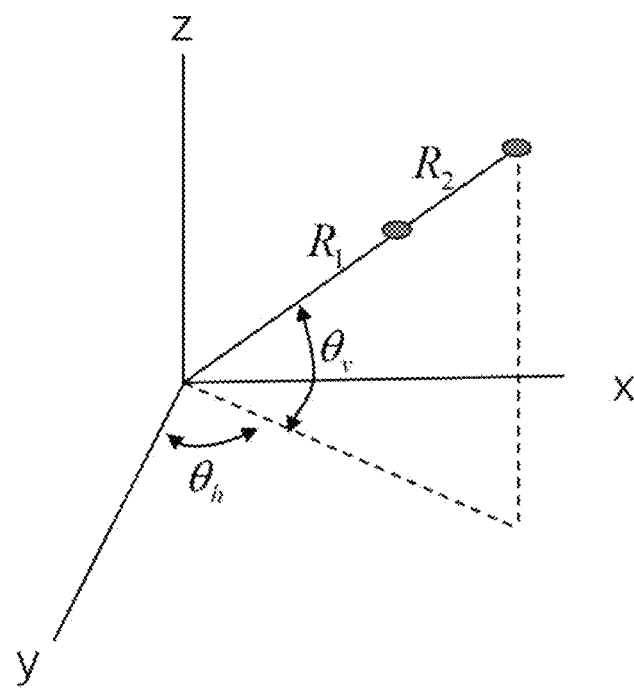
FIG. 3 is a schematic diagram of scan angles including a horizontal azimuth angle, a pitch angle, and a spatial angle according to an embodiment of the present invention.

As shown in FIG. 2, phase shifts are respectively controlled to be 0, $2\pi d_2 \sin\theta_0/\lambda_c$, and $2\pi d_K \sin\theta_0/\lambda_c$, a first antenna being taken as a reference point, where $d_k$ (k=2, ... N) represents a distance between a $k^{th}$ transmit antenna and the first transmit antenna, and $\lambda$ represents a wavelength corresponding to a linear-frequency-modulation continuous-wave center frequency. A phase shifter, a time delay line, or another phase shift control technology may be used to control the phase shift. The transmit antenna array is arranged at equal spacing or at unequal spacing sparsely. Further, the scanning angle and distribution are determined according to a measurement requirement or a spatial arrangement of the point or target for inspection. In order to achieve the control over transmit beam synthesis focusing, the transmit antenna array is arranged horizontally during scanning at a horizontal angle, the transmit antenna array is arranged vertically during scanning at a pitching angle, and the transmit antenna array is arranged both horizontally and vertically during scanning at a spatial angle. As shown in FIG. 3, if the vibration and deformation of two targets or points for inspection at respective spatial distances of R1 and R2 from an antenna are measured, the beam synthesis angle of the transmit antenna arranged horizontally needs to be set to $\theta_h$, with the beam synthesis pitch angle of the transmit antenna set to $\theta_v$. The specific arrangement of the transmit antenna array may be linear, planar, circular, or arranged in other regular or irregular patterns as needed to implement the beam synthesis control. It should be noted that in actual phase shift control, there is an inherent phase offset due to factors including differences in antenna array layout routing length, differences in transceiver packaging, and intrinsic errors in the phase shifter. Therefore, an additional compensating and correcting phase offset vector needs to be added to the final phase shift control sequence on the basis of the calculated theoretical phase shift control sequence.

A method of extracting vibration and deformation displacement values of a single target (or point for inspection) or multiple targets (or points for inspection) in a specific angle direction during a scanning cycle includes: setting a transmit signal of the first transmit antenna to $s_1(t)$, and according to the phase shift control method of the transmit antenna array, expressing the synthesized transmit signal by using the following formula:

$$s_T(t,\theta) = a(\theta)^H s_1(t)(\theta_0)$$

where $a(\theta_0)=[1, e^{j2\pi d_2 \sin\theta_0/\lambda_c}, e^{j2\pi d_K \sin\theta_0/\lambda_c}]^T$, $a(\theta)=[1, e^{j2\pi d_2 \sin\theta_0/\lambda_c}, e^{j2\pi d_K \sin\theta_0/\lambda_c}]^T$, $(\bullet)^H$ represents conjugate transpose calculation of a matrix, $(\bullet)^T$ represents transpose calculation of a matrix, j represents an imaginary number unit, $2\pi d_k \sin\theta_0/\lambda_c$ represents a phase shift value of a $k^{th}$ transmit antenna relative to the first transmit antenna (a reference point), $d_k$ represents the distance of the $k^{th}$ transmit antenna relative to the first transmitting antenna, $\lambda_c$ represents the wavelength corresponding to the linear-frequency-modulation continuous-wave center frequency, and $\theta_0$ represents the angle of the beam scanning with the center axis as the reference. The signal transmitted by each transmit antenna is a linear frequency-modulation continuous-wave signal or another signal equivalent to a linear frequency-modulation continuous wave.

The transmit signal $s_1(t)$ of the first transmit antenna is expressed using the following formula:

$$s_1(t) = A_T \exp\left[j\left(2\pi f_0 t + \frac{\pi B}{T_{sweep}} t^2 + \phi_0\right)\right]$$

where $A_T$ represents an amplitude of a transmitted signal, $f_0$ represents s starting frequency of a transmitted carrier, B represents a transmission bandwidth, $T_{sweep}$ represents a sweep cycle, t represents a time variable within the sweep cycle, and $\phi_0$ represents an initial phase.

To facilitate the explanation of the testing principle, if the transmit antennas are arranged at equal spacing of d (that is, $d_k = (k-1)d$) the signals that are transmitted in each sweep cycle and synthesized in the direction of an angle $\theta$ can be expressed using the following formula:

$$\begin{aligned} s_T(t,\theta) &= a(\theta)^H s_1(t) a(\theta_0) \\ &= \sum_{k=0}^{K-1} s_1(t) e^{j[2\pi k d_k (\sin\theta_0 - \sin\theta)/\lambda_c]} \\ &= \frac{\sin[K\pi d(\sin\theta_0 - \sin\theta)/\lambda_c]}{\sin[\pi d(\sin\theta_0 - \sin\theta)/\lambda_c]} e^{j[(K-1)\pi d(\sin\theta_0 - \sin\theta)/\lambda_c]} s_1(t) \end{aligned}$$

The baseband signal, obtained by mixing with the local oscillator signal and low-pass filtering, in the i-th sweep cycle of a channel corresponding to the first receive antenna is expressed as the following formula:

$$s_B(t, \theta, iT_{sweep}) = A_B \exp\left\{ j\left[\frac{4\pi BR}{cT_{sweep}}t + \frac{4\pi R}{\lambda_0} + \frac{4\pi x(iT_{sweep})}{\lambda_c}\right]\right\} \exp[j(K-1)\psi]\frac{\sin(K\psi)}{\sin\psi}$$

where $\psi=\pi d(\sin\theta_0 - \sin\theta)/\lambda_c$, $A_B$ represents an amplitude of the baseband signal, $T_{sweep}$ represents a sweep cycle, R represents a distance between a target or point for inspection and a microwave transceiver, $\lambda_0$ represents a wavelength corresponding to a starting frequency of the linear-frequency-modulation continuous wave, $x(iT_{sweep})$ represents an element value of an ith sweep cycle corresponding to a vibration and deformation displacement sequence value of an inspected target or point in a current scan cycle, and K represents a quantity of transmit antennas transmitting signals simultaneously. A quantity i of transmit cycles at each scan angle is equal to 1 or a positive integer greater than 1. When the quantity is greater than 1, according to a requirement, the sequence element value is an average or optimal value or another selected value in a plurality of transmit sweep cycle times.

$$f_b = \frac{2BR}{cT_{sweep}}, \varphi_R = \frac{4\pi R}{\lambda_0}, \text{ and } \varphi_i = \frac{4\pi x(iT_{sweep})}{\lambda_c}$$

are set. Through demodulation of the beat-frequency $f_b$, the phase complex vector is expressed by means of the following formula:

$$s(R, \theta, iT_{sweep}) = A_B \exp\{j[\varphi_R + \varphi_i]\} \exp[j(K-1)\psi]\frac{\sin(K\psi)}{\sin\psi}$$

It can be seen that through the spatial synthesis of the transmit beam, taking an equidistant transmit array as an example, the mathematical model of the baseband signal is used for derivation and demodulation analysis, and a linear relationship is formed between the vibration/deformation displacement of inspected target or point and $\varphi_i$, the constant phase of the linear relationship being $\varphi_i$. In this case, the amplitude of the phase complex vector is increased by a factor of $$\frac{\sin(K\psi)}{\sin\psi},$$

and the signal-to-noise ratio is significantly improved. When $\theta = \theta_0$, the amplitude is $$\frac{\sin(K\psi)}{\sin\psi} = K$$

times that of a single transmit antenna, and the power is $K^2$ times that of a single transmit antenna. It can be seen that the mechanism and method for measuring vibration and deformation based on beam synthesis focusing greatly increase the intensity of the signal radiated to the inspected target or point, greatly improve a signal-to-noise ratio of the vibration and deformation measurement of the target or point for inspection, effectively reduce noise interference, thereby resolving the problem of precisely measuring vibration and deformation at long distances under an ultra-micro amplitude.

When the spacings of transmit array antennas are non-uniform, according to the principle of beam space superposition synthesis, it is equivalent to non-uniform beam superposition synthesis, which only affects the ratio of the main lobe of the synthesized beam. This also applies to the mechanism and method for measuring vibration and deformation through the beam scanning derived and established as described above.

Furthermore, with respect to the channel scanning angle $\theta_0$ of the receive antenna array, the phase complex vector of the baseband signal can be expressed by means of the following formula:

$$s'(R, \theta, iT) = A_B \exp\{j[\varphi_R + \varphi_i]\}\exp[j(K-1)\psi]\frac{\sin(K\psi)}{\sin\psi}\begin{bmatrix} 1 \\ \exp(j(2\pi d_{rx2}\sin\theta_0/\lambda_c)) \\ \vdots \\ \exp(j(2\pi d_{rxM}\sin\theta_0/\lambda_c)) \end{bmatrix}$$

where $\lambda_c$ represents the wavelength corresponding to the linear-frequency-modulation continuous-wave center frequency, and $\theta_0$ represents the angle of the beam scanning with the center axis as a reference. $d_{rxm}$ (m=1, ..., M) respectively represent distances between m receive antennas and the first receive antenna, where $d_{rx1}=0$, and M represents a quantity of receive antennas greater than 1. The receive antennas are arranged at equal spacing or at unequal spacing sparsely.

Therefore, a vibration and deformation displacement sequence element value $x(p,\theta_s,R)$, extracted through the non-linear demodulation method, of an inspected target or point in a current scan cycle is calculated by means of the following formula:

$$x(p, \theta_s, R, iT_{sweep}) = \arg\left\{\sum_{m=1}^{M}\sum_{n=0}^{N-1} s_B(p, \theta_s, iT_{sweep}, nT_s)\exp[-j(2\pi \hat{f}_R nT_s)]\exp\left[-j\left(2\pi\frac{d_{rxm}\sin\theta_s}{\lambda_c}\right)\right]\right\} \lambda_c/4\pi$$

where x $(p,\theta_s,R,iT_{sweep})$ represents a displacement sequence element value of a target or point for inspection at a current scan angle distance of R during a pth circular scan with a beam scan angle of $\theta_s$ and a transmit sweep cycle of i, $T_{sweep}$ represents a sweep cycle of a transmit antenna transmitting a linear-frequency-modulation continuous wave, arg[•] represents calculation for a complex phase value, N represents a quantity of single-channel baseband signal elements in each sweep cycle, n represents a serial number of a single-channel baseband signal element in each sweep cycle, and $T_s$ represents a baseband signal sampling frequency time; and $s_B(p,\theta_s,iT,nT_s)$ represents a matrix formed by M channel baseband signals in the ith transmit sweep cycle during a pth circular scan at a beam scan angle of $\theta_s$, a column vector of the matrix is a baseband signal of a m=1, 2, ..., Mth channel, j represents an imaginary number unit, $\hat{f}_R$ represents a beat-frequency estimated value corresponding to a distance of the inspected target or point, and $d_{r \times m}$ (m=1, ..., M) respectively represent distances between m receive antennas and the first receive antenna, where $d_{r \times 1}=0$, and $\lambda_c$ represents a wavelength corresponding to the linear-frequency-modulation continuous-wave center frequency. In the forgoing nonlinear demodulation calculation method, without changing the essence, another demodulation calculation formula may also be applied on this basis.

A quantity i of transmit sweep cycles at each scan angle is equal to 1 or a positive integer greater than 1, and when the quantity is greater than 1, according to a requirement, the sequence element value $x(p,\theta_s,R)$ is an average or optimal value or another selected value of sequences of $x(p,\theta_s,R, iT_{sweep})$ in a plurality of transmit sweep cycle times in the current scan cycle.

It can be seen from the above analysis and derivation that vibration and deformation of a point or target for inspection at a specific angle direction can be measured based on beam synthesis focusing each time by using the scanning method and system for measuring microwave vibration and deformation under a mechanism of beam synthesis scanning. The method and system greatly suppress the clutter interference caused by other targets or points for inspection outside the angle direction (with reference to beam synthesis focusing, according to the proportional coefficient $$\frac{\sin(K\psi)}{\sin\psi}$$

of signal strength amplitudes of different angular orientations, it can be seen that the scan angle direction is significantly higher than that of a near direction), resolving the problem of clutter interference caused by other targets or points for inspection, especially the problem of coupling clutter interference of targets or points for inspection at adjacent angles, thereby greatly improving measurement accuracy and reliability.

The circular scanning method includes: according to a measurement requirement, sequentially changing the scan angle $\theta_s$ through the phase shift control, where s=0, 2, ..., a positive integer of S−1, and according to the foregoing method, extracting vibration and deformation displacement element values of all targets or points for inspection in the scan range. A scan angle of a target or point for inspection is set to $\theta_s$, and a distance to an antenna is set to R, such that the vibration and deformation displacement time sequence obtained finally is $[x(1,\theta_s,R), ..., x(p,\theta_s,R), ...]$ where p=1, 2, ..., P represents a circular scanning cycle number, and the time interval refers to the time used for one circular scan or to a circular scan cycle.

Taking the vibration and deformation displacement time sequence of the specific target or point for inspection as an example, the general constant phase is processed as needed, for example, by subtracting the average value or the initial value of the sequence.

Therefore, in the present invention, vibration and deformation of a point or target for inspection at a set specified beam angle direction can be measured by establishing a beam synthesis scanning mechanism and using a scanning method and system for measuring microwave vibration and deformation under such mechanism, resolving the problem that aiming targets such as corner reflectors need to be pasted or mounted for measuring microwave vibration and deformation of multiple points or points for inspection in full field of surface structure objects, reducing the impact on the dynamic performance of the structure for inspection, and improving measurement convenience and ease of operation. Therefore, the present invention can be applied to occasions where the aiming target cannot be pasted.

In addition, the present invention can easily and substantially improve resolution in the angular dimension via microwave vibration and deformation measurement through scanning based on phase shift control over beam synthesis. It is easy to achieve a scan angle resolution of 1° and below through phase shift control, but if the angle resolution of 1° is to be achieved through the existing multi-transmission and multi-reception array antenna, more than 100 physical or virtual channels are required. Therefore, the present invention resolves the problem that the existing microwave full-field vibration measurement technology needs to rely on a large number of transceiver channels for virtual array reconstruction to achieve high angular resolution, implementing the vibration and deformation measurement with high spatial resolution of multi-points or full-field points for inspection.

Figure 4:
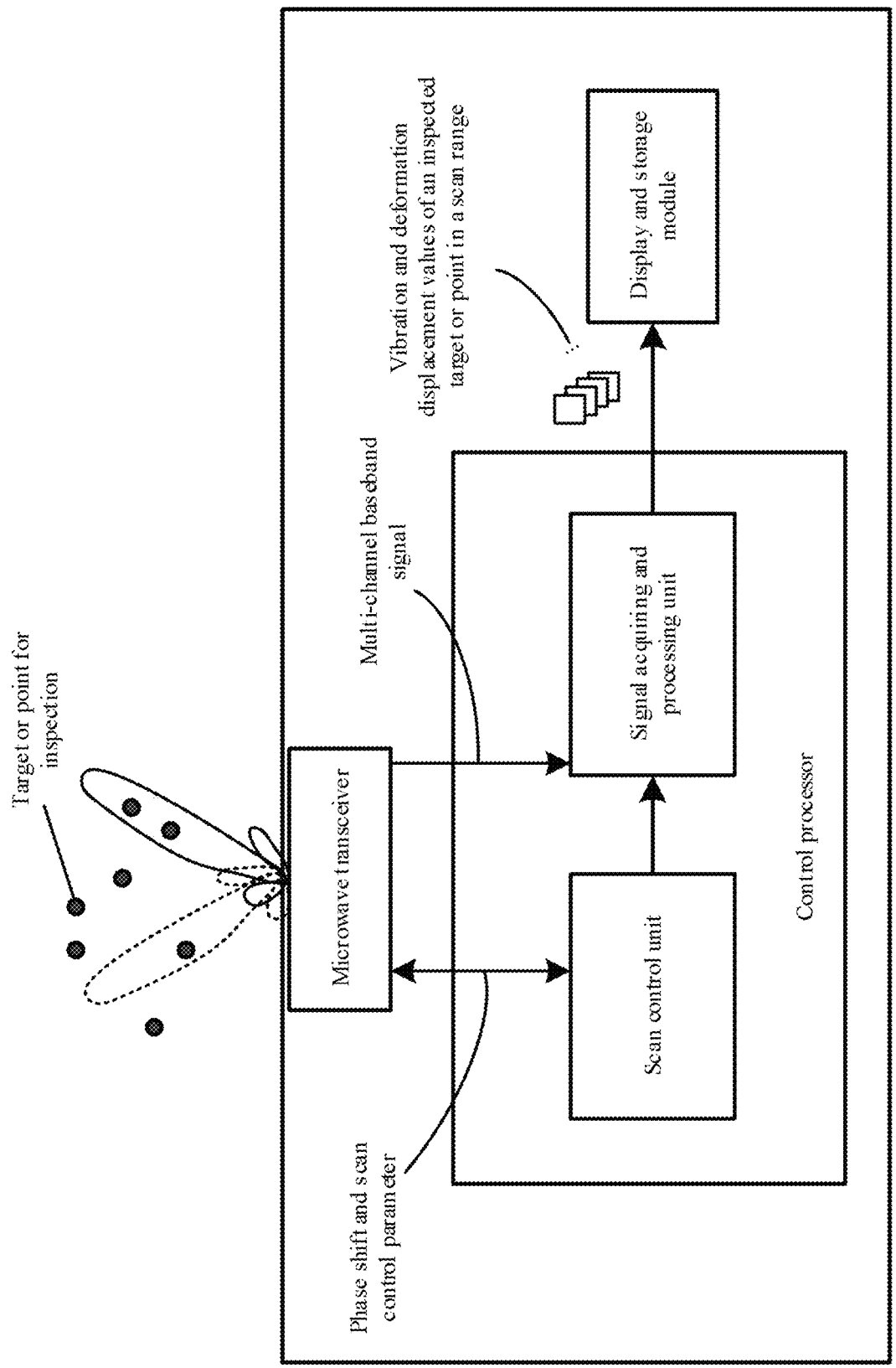
FIG. 4 is a structural block diagram of a scanning system for measuring microwave vibration and deformation according to an embodiment of the present invention.

The present invention further provides a scanning system for measuring microwave vibration and deformation. As shown in FIG. 4, the system includes:

a microwave transceiver configured to simultaneously transmit linear-frequency-modulation continuous-wave microwave signals of a plurality of channels by using a transmit antenna array, receive echo signals, output multi-channel baseband signals, and circularly scan a synthesized beam through phase shift control of transmit antennas.

Figure 5:
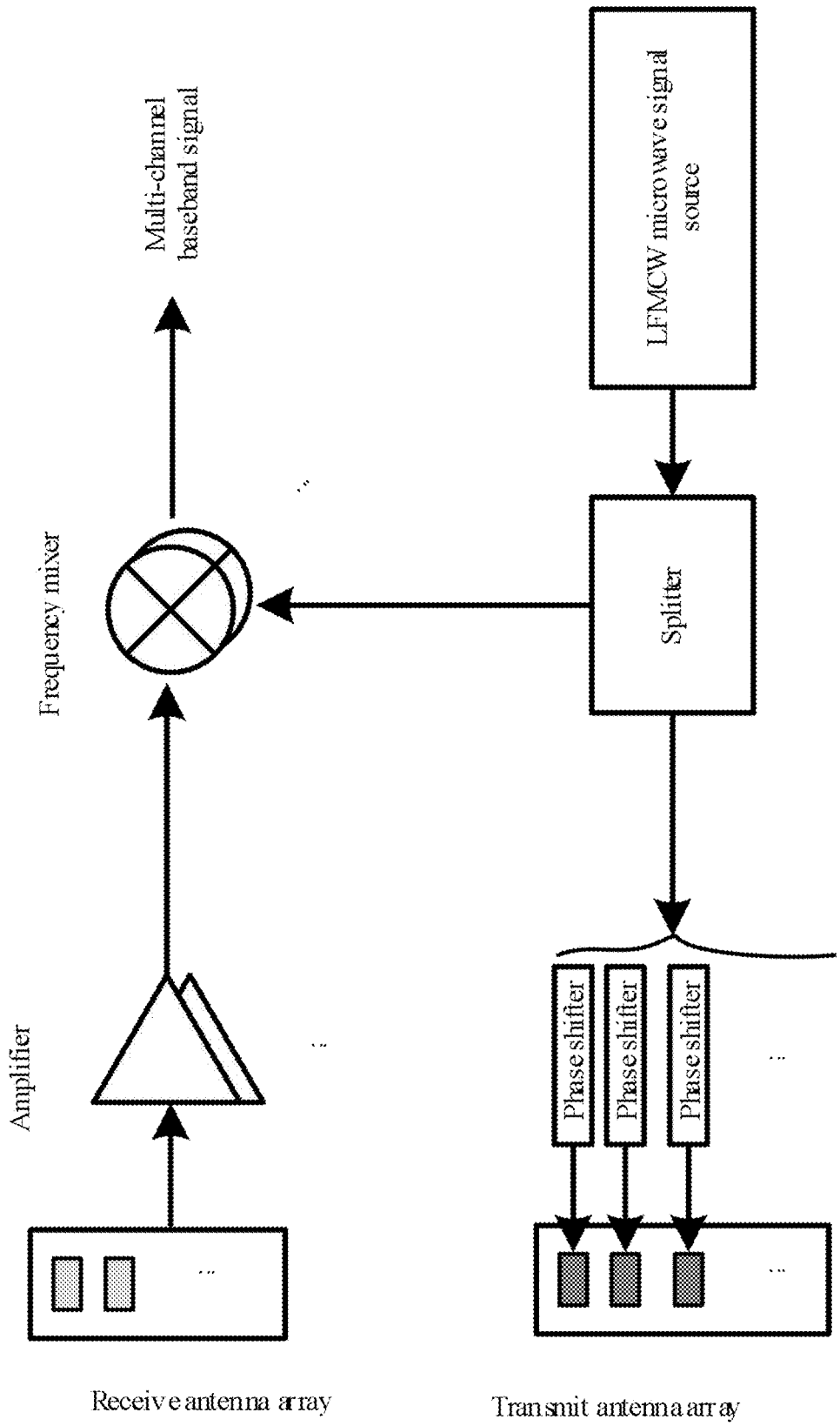
FIG. 5 is an overall structural block diagram of a microwave transceiver according to an embodiment of the present invention.
Figure 6A:
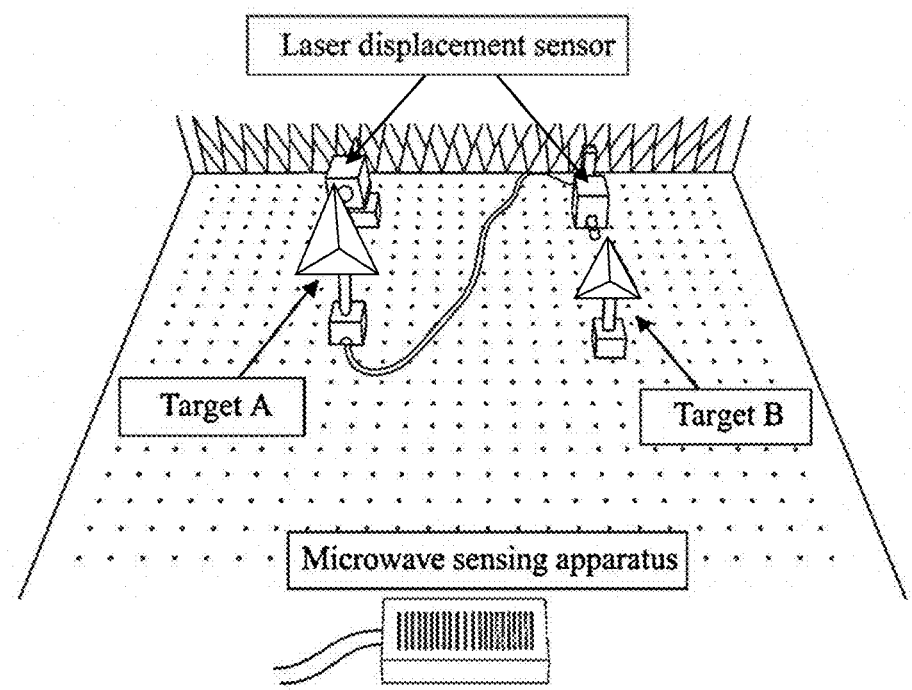
FIGS. 6A, 6B, and 6C are respectively an experimental scene diagram for comparative analysis of measurement accuracy and a comparison diagram of a measurement result between targets A and B according to an embodiment of the present invention.
Figure 6B:
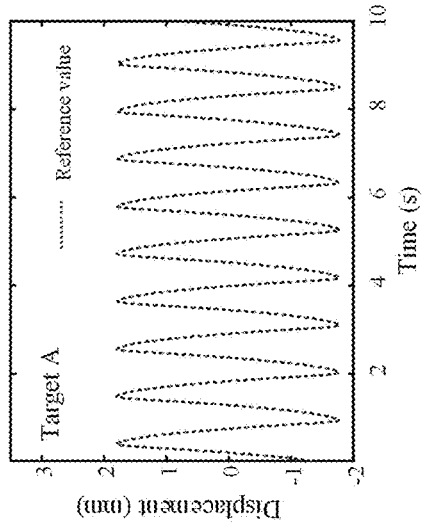
Figure 6B:
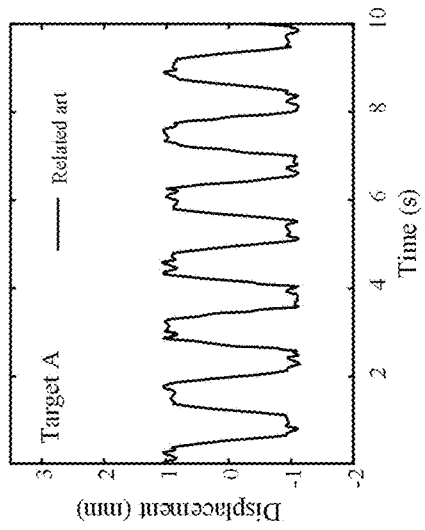
Figure 6B:
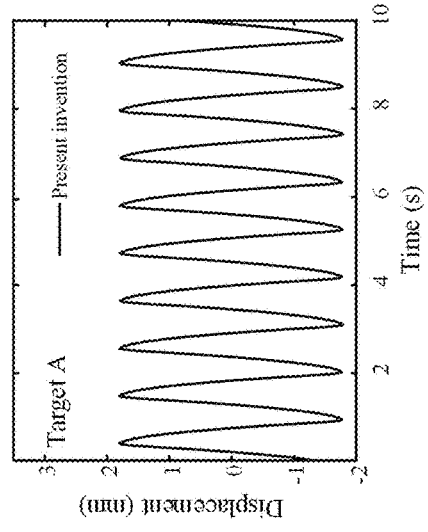
Figure 6C:
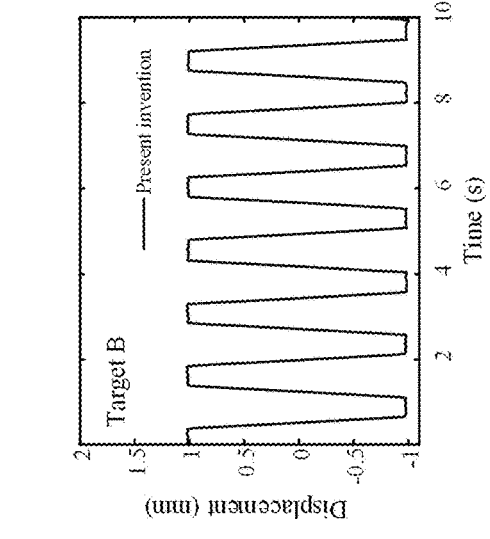

As shown in FIG. 5, the microwave transceiver includes a linear-frequency-modulation continuous-wave microwave signal source, a power divider, a frequency mixer, a phase shifter, an amplifier, a transmit antenna array, and a receive antenna array. The signal source is connected to the power divider, having part connected to the phase shifter and radiating signal through a transmit antenna and the other part being taken as a local oscillator signal for mixing. The phase shifter is connected to the transmit antenna and configured to make, through phase shift regulation, a main lobe of the synthesized beam transmitted by the transmit antenna array directed towards a specific set scan angle. The receive antenna array is connected to the amplifier, an outputted amplified signal is connected to the frequency mixer, mixed with a local oscillator signal at the frequency mixer, so as to output multi-channel baseband signals. The transmit antenna array is capable of being arranged horizontally, vertically, or both horizontally and vertically according to scanning requirements of a spatial attitude angle and pitching angle. A quantity of transmit antennas in the transmit antenna array needs to be greater than or equal to 2, and the transmit antennas are arranged at equal or unequal spacing; and a quantity of receive antennas in the receive antenna array needs to be greater than or equal to 1 and the receive antennas are arranged at equal or unequal spacing. A quantity of phase shifters is equal to the quantity of transmit antennas and in addition to the phase shifter, a time delay line or another device with a phase shift control function may also be used for phase shift control.

The system further provides a control processor configured to control beam scanning by microwave transceiver, baseband signal acquisition, and extraction on vibration and deformation displacement of inspected targets or points.

The control processor includes a scan control unit and a signal acquiring and processing unit. The scan control unit is configured to control phase shift of the transmit antenna channel, control a circular scan cycle, and control other conventional parameters of the microwave transceiver; and the phase shift control is implemented through configuration of the phase shifter connected to each transmit antenna. The signal acquiring and processing unit is configured to synchronously acquire multi-channel baseband signals and process the acquired baseband signals to extract vibration and deformation displacement values of the inspected target or point; and The system further provides a display and storage module configured to display or store system scan angle distribution, vibration and deformation displacement sequence values or waveforms of all inspected targets or points, and other intermediate processing information.

Those skilled in the art can understand this embodiment as a more specific description of Embodiment 1 and Embodiment 2.

Embodiment 4

Embodiment 4 is the embodiment of the test verification of foregoing embodiments, to further illustrate the beneficial effects of the present invention.

As shown in FIG. 6, on the basis of the scanning method and system for measuring microwave vibration and deformation provided by the present invention, the accuracy verification experiment of dual-target vibration measurement further describes the present invention and is compared with an existing method for measuring vibration and deformation of a linear-frequency-modulation continuous-wave microwave, where a high-precision laser displacement sensor (1-micron accuracy) is used to provide a reference value. In the experiment, the distances between target A and target B and the microwave sensing device are close, and they are in different vibration states. In the experimental measurement, the scanning system for measuring microwave vibration and deformation has transmit antenna array units of 9, a transmit bandwidth of 3 GHz, and a scan frequency of 50 Hz. FIGS. 6B and 6C respectively show the comparison results of the vibration displacement waveforms of target A and target B respectively. It can be seen that because target A and target B are in close distances in the image, an obvious coupling clutter interference is present, the existing linear-frequency-modulation continuous-wave microwave vibration measurement has a large measurement error, and thus the measurement fails Comparably speaking, in the technology of the present invention, vibration and deformation of a point or target for inspection at a specific angle direction can be measured based on beam synthesis focusing each time by using the scanning method and system for measuring microwave vibration and deformation under a mechanism of beam synthesis scanning, where the signal strength in the scanning focus angle direction is significantly higher than those in other directions, resolving the problem of clutter interference caused by other targets or points for inspection, especially the problem of coupling clutter interference of targets or points for inspection at adjacent angles, and greatly improving measurement accuracy and reliability.

Figure 7A:
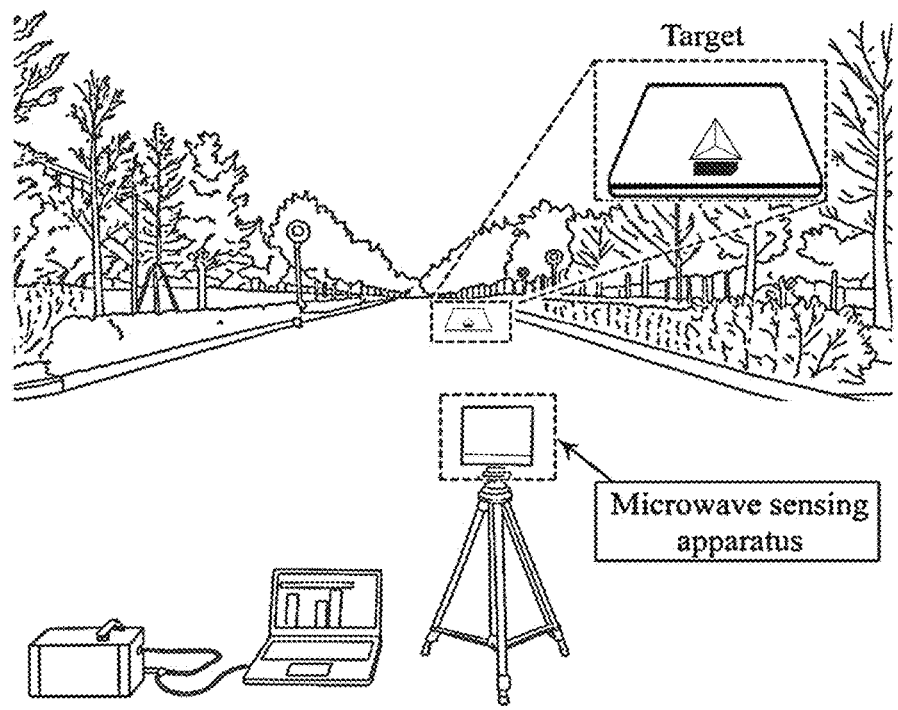
FIGS. 7A and 7B are respectively an experimental scene diagram of measurement on vibration and deformation at long distances and a comparison diagram of a measurement accuracy result according to an embodiment of the present invention.
Figure 7B:
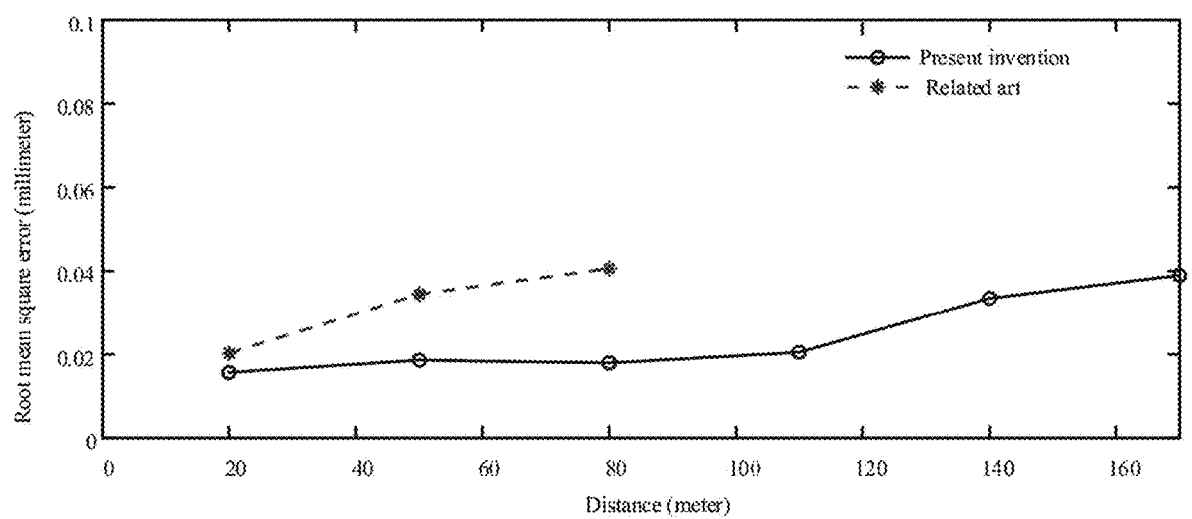

As shown in FIG. 7, on the basis of the scanning method and system for measuring microwave vibration and deformation provided by the present invention, the performance verification experiment of vibration measurement at different distances further described the present invention and compared with the existing method for measuring vibration of microwave for multiple transmission and multiple reception. FIG. 7B shows a comparison result of measurement errors at different test distances, the result being expressed through root mean square error (RMSE). It can be seen that with the increase of the measurement distance in the existing technology, the measurement error increases significantly, especially at a distance of 110 m and beyond, and because the signal energy is weak, vibration measurement can no longer be performed, but the technology of the present invention can implement long-distance high-precision vibration measurement. Because the present invention is based on the mechanism and method for measuring vibration and deformation according to beam synthesis focusing, the intensity of the signal radiated to the inspected target or point is greatly increased. This greatly improves a signal-to-noise ratio of the vibration and deformation measurement of the inspect target, effectively reduces noise interference, and increases the measurement distance, thereby resolving the problem of measuring vibration and deformation at long distances.

Figure 8A:
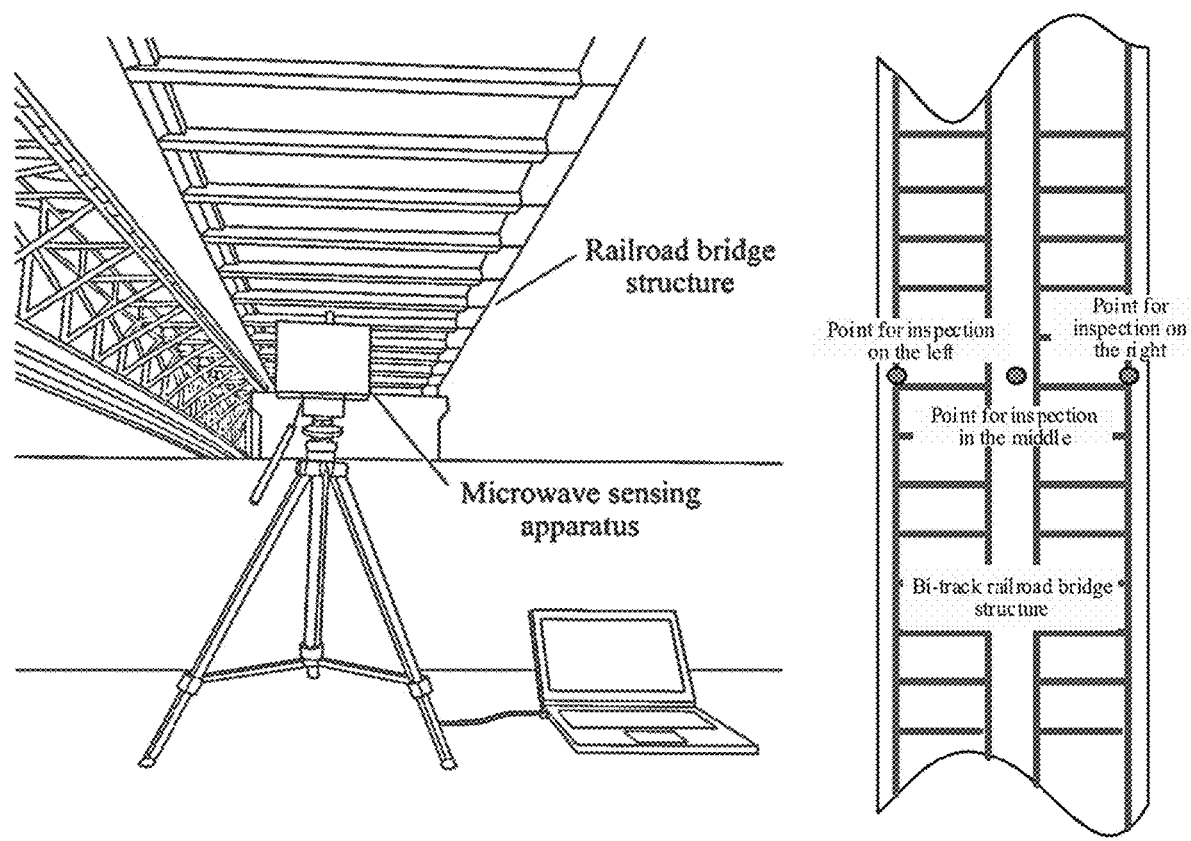
FIGS. 8A, 8B, and 8C are respectively an experimental scene diagram of measurement on vibration and deformation of an example bridge structure, a measurement result diagram of vibration and deformation under operation of a left train, and a measurement result diagram of vibration and deformation under operation of a right train.
Figure 8B:
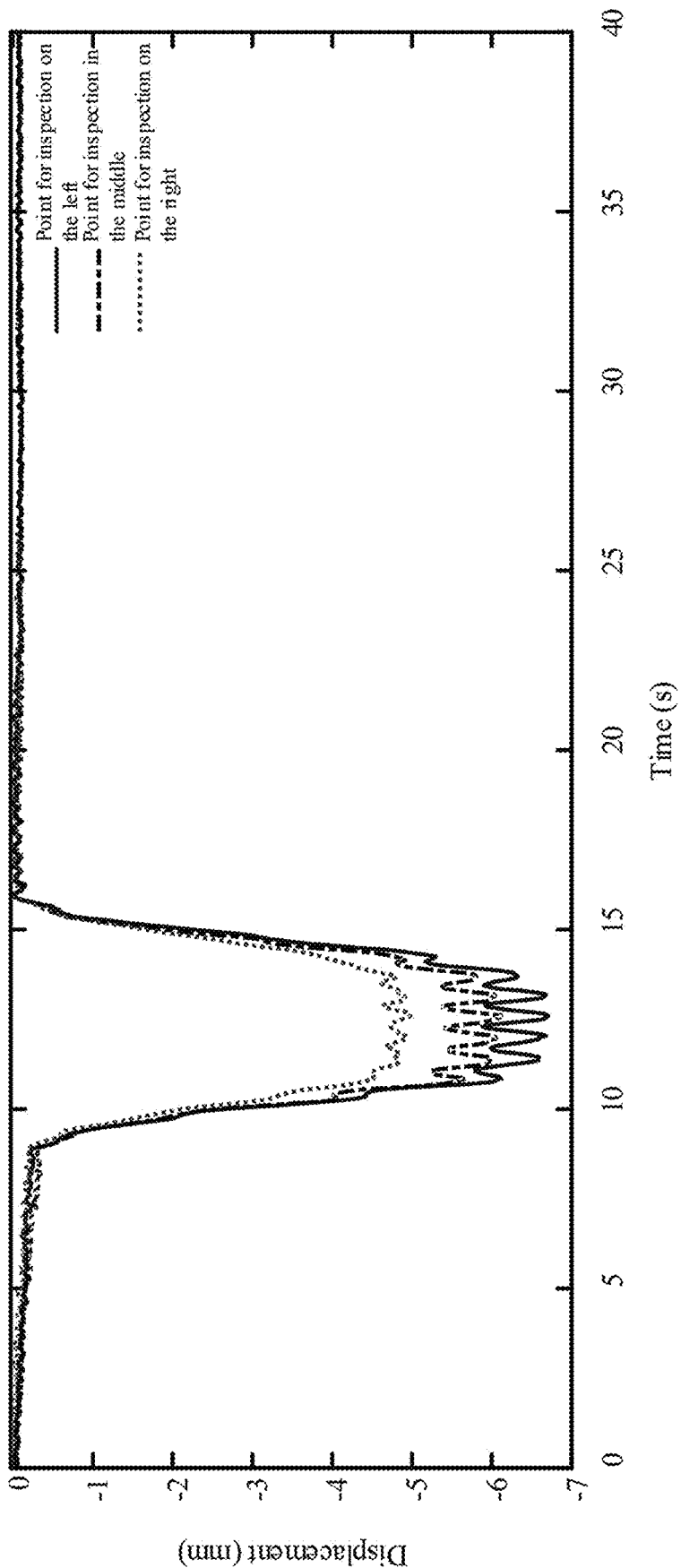
Figure 8C:
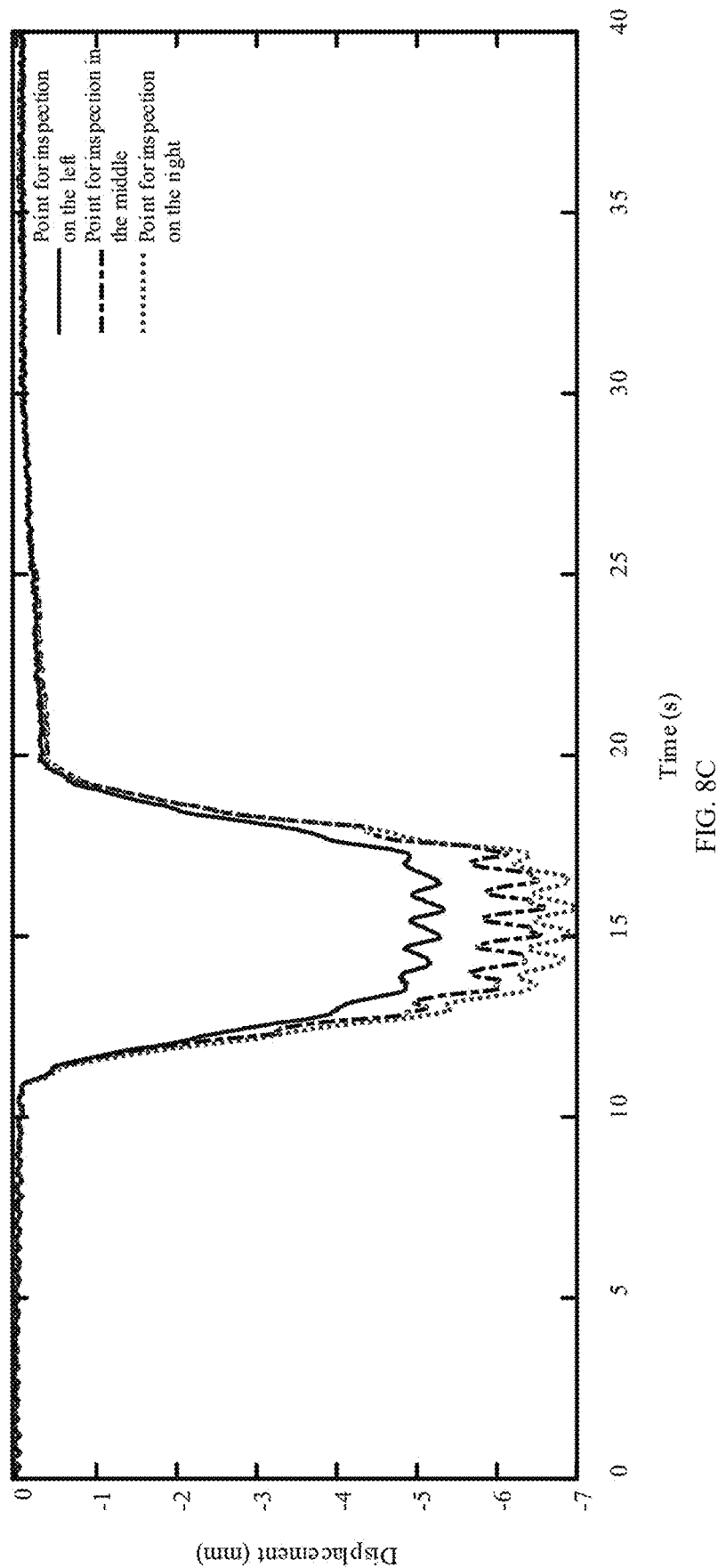

As shown in FIG. 8, on the basis of the scanning method and system for measuring microwave vibration and deformation provided by the present invention, the present invention is further described through the experiment of measuring vibration and deformation (especially the torsional deformation) of a railroad bridge structure. As shown in FIG. 8A, the railroad bridge structure is provided with two side-by-side tracks on which forward and reverse trains run respectively. Vibration and deformation occur when the train passes by, and torsion occurs on different sides. The vibration and deformation must be controlled within the safety threshold. In the experiment, the scanning method and system for measuring microwave vibration and deformation provided by the present invention are used to scan with a scan frequency of 20 Hz three points for inspection on the left, middle and right sides of the middle span of the bridge structure so as to measure the vibration and deformation. On the basis of the technology of the present invention, FIGS. 8B and 8C respectively show the vibration and deformation displacement waveforms of the three points for inspection under the operation of the left and right trains. It can be seen that under the operation of the trains, the three points for inspection all produce large flexural deformation and vibration, and the bridge structure also is deformed torsionally. Comparably speaking, due to the long measurement distance, the angle images of the left and right points for inspection are relatively close. The existing microwave full-field vibration measurement technology needs to rely on a large number of transceiver channels for virtual array reconstruction to achieve high angular resolution, and thus it is difficult to measure the vibration and deformation of the three points for inspection on the left, middle, and right sides. In addition, the present invention can easily and substantially improve resolution in the angular dimension via microwave vibration and deformation measurement through scanning based on phase shift control over beam synthesis and is easy to achieve a scan angle resolution of 1° and below through phase shift control, so as to measure vibration and deformation of multiple targets or points for inspection at close angles at far distances, and facilitates suppressing coupling clutter interference, thereby improving measurement accuracy. Therefore, through the measurement on vibration and deformation in a scanning manner, the present invention resolves the problem that aiming targets such as corner reflectors need to be pasted or mounted for measuring microwave vibration and deformation of multiple points or points for inspection in full field, improving experiment convenience and ease of operation.

It should be noted that on the base of the mechanism and method for measuring vibration and deformation through scanning provided by the present invention, in the present invention, the transmit wave form including single-frequency continuous wave and pulse wave can be also used so as to correspondingly measure the microwave vibration and deformation through scanning.

Those skilled in the art should know that the functions of the system provided by the present invention and various apparatuses, modules, and units thereof are implemented in a purely computer-readable program code manner, and the method steps are programmed logically so as to implement, by using logic gates, switches, application specific integrated circuits, programmable logic controllers, embedded microcontrollers, and the like, the functions of the system provided by the present invention and various apparatuses, modules, and units thereof. Therefore, the system provided by the present invention and various apparatuses, modules, and units thereof can be considered as hardware components, and the apparatuses, modules, and units included in the system for performing various functions can also be regarded as structures in the hardware components. The apparatuses, modules, and units for implementing various functions can also be regarded as not only software modules for implementing the method, but also structures in hardware components.

Compared with the related art, the present invention has the following beneficial effects:

1. In the present invention, vibration and deformation of a point or target for inspection at a set specified beam angle direction can be measured by establishing a beam synthesis scanning mechanism and using a scanning method and system for measuring microwave vibration and deformation under such mechanism, resolving the problem that aiming targets such as corner reflectors need to be pasted or mounted for vibration and deformation measurement on microwave multi-points and full-field measuring points of surface structure objects, reducing the impact on the dynamic performance of the structure for inspection, and improving measurement convenience and ease of operation. Therefore, the present invention can be applied to occasions where the aiming target cannot be pasted.

2. The present invention can easily and substantially improve resolution in the angular dimension via microwave vibration and deformation measurement through scanning based on phase shift control over beam synthesis, resolving the problem that the existing microwave full-field vibration measurement technology needs to rely on a large number of transceiver channels for virtual array reconstruction to achieve high angular resolution and implementing the vibration and deformation measurement with high spatial resolution of multi-points or full-field points for inspection.

3. In the present invention, vibration and deformation of a point or target for inspection at a specific angle direction can be measured based on beam synthesis focusing each time by using the scanning method and system for measuring microwave vibration and deformation under a mechanism of beam synthesis scanning, resolving the problem of clutter interference caused by other targets or points for inspection, especially the problem of coupling clutter interference of targets or points for inspection at adjacent angles, thereby greatly improving measurement accuracy and reliability. In this case, the mechanism and method for measuring vibration and deformation based on beam synthesis focusing greatly improve a signal-to-noise ratio of the vibration and deformation measurement of the target or point for inspection and effectively reduce noise interference, thereby resolving the problem in the related art of precisely measuring vibration and deformation under an ultra-micro amplitude at long distances.

Specific embodiments of the present invention have been described above. It should be understood that the present invention is not limited to the foregoing specific implementations, and those skilled in the art may make various changes or modifications within the scope of the claims, which do not affect the essence of the present invention. In the case of no conflict, the embodiments of the present application and the features in the embodiments can be combined with each other arbitrarily.

The invention claimed is:

1. A scanning method for measuring microwave vibration and deformation, comprising the following steps:

step S1: simultaneously transmitting linear-frequency-modulation continuous waves by using a plurality of transmit antennas, performing a phase shift control on transmit signals of the plurality of transmit antennas, and enabling a main lobe of a synthesized beam to be directed towards a measured specific angle direction;

step S2: receiving echoes by using a plurality of receive antennas to obtain multi-channel baseband signals, and performing a non-linear demodulation processing on the acquired multi-channel baseband signals to obtain vibration and deformation displacement values of a single target or point for inspection in an angle direction 1 of a cycle or obtain vibration and deformation displacement values of a plurality of targets or points for inspection in the angle direction 1 of the cycle;

step S3: offsetting an angle of the main lobe of the synthesized beam through the phase shift control on the plurality of transmit antennas, and extracting vibration and deformation displacement values of a single target or point for inspection in an angle direction 2 of the cycle based on the foregoing method or vibration and deformation displacement values of a plurality of targets or points for inspection in the angle direction 2 of the cycle; according to a measurement requirement, measuring and extracting vibration and deformation displacement values of a single target or point for inspection in another angle direction of the cycle or measuring and extracting vibration and deformation displacement values of a plurality of targets or points for inspection in the another angle direction of the cycle; and step S4: according to the foregoing scanning method, at intervals of a specific cycle time, measuring vibration and deformation through circular scanning in angle directions, to obtain vibration and deformation displacement time sequence values of all scanned points or targets for inspection.

2. The scanning method for measuring the microwave vibration and deformation according to claim 1, wherein in step S1, the performing phase shift control on transmit signals of the plurality of transmit antennas is completed through the following method:

if an angle of a target or point for inspection in a microwave front-end radiating wave is set to $\theta_0$, controlling phase shifts of antennas in the transmit array respectively to be 0, $2\pi d_2 \sin\theta_0/\lambda_c$, ..., and $2\pi d_K \sin\theta/\lambda_c$, a first antenna being taken as a reference point, wherein $d_k$ (k=2, . . . N) represents a distance between a $k^{th}$ transmit antenna and the first transmit antenna, and $\lambda_c$ represents a wavelength corresponding to a linear-frequency-modulation continuous-wave center frequency; and arranging the transmit antenna array at equal spacing or at unequal spacing sparsely, wherein the transmit antenna array is arranged horizontally during scanning at a horizontal angle, the transmit antenna array is arranged vertically during scanning at a pitching angle, and the transmit antenna array is arranged both horizontally and vertically during scanning at a spatial angle.

3. The scanning method for measuring the microwave vibration and deformation according to claim 1, wherein the scanning angle and distribution are determined according to a measurement requirement or a spatial arrangement of the point or target for inspection.

4. The scanning method for measuring the microwave vibration and deformation according to claim 1, wherein the scan angle direction required in steps S1 to S3 is obtained according to prior knowledge, the measurement requirement, or initial locating information of points for inspection in full field.

5. The scanning method for measuring the microwave vibration and deformation according to claim 1, wherein in steps S2 to S4, a non-linear demodulation method for extracting vibration and deformation displacement values of a single target, point for inspection, a plurality of targets, or points for inspection in a specific scan-cycle angle direction comprises the following steps:

calculating, by means of the following formula, a vibration and deformation displacement sequence element value $x(p,\theta_s,R)$, extracted through the non-linear demodulation method, of an inspected target or point in a current scan cycle:

$$x(p, \theta_s, R, iT_{sweep}) =$$

$$\arg\left\{\sum_{m=1}^{M}\sum_{n=0}^{N-1} s_B(p, \theta_s, iT_{sweep}, nT_s)\exp[-j(2\pi \tilde{f}_R nT_s)]\exp\left[-j\left(2\pi \frac{d_{rxm}\sin\theta_s}{\lambda_c}\right)\right]\right\}$$

$$\lambda_c/4\pi$$

wherein $x(p,\theta_s,R,iT_{sweep})$ represents a displacement sequence element value of a target or point for inspection at a current scan angle distance of R during a pth circular scan with a beam scan angle of $\theta_s$ and a transmit sweep cycle of i, $T_{sweep}$ represents a sweep cycle of a transmit antenna transmitting a linear-frequency-modulation continuous wave, arg[•] represents calculation for a complex phase value, N represents a quantity of single-channel baseband signal elements in each sweep cycle, n represents a serial number of a single-channel baseband signal element in each sweep cycle, and $T_s$ represents a baseband signal sampling frequency time; and $s_B(p,\theta_s,iT,nT_s)$ represents a matrix formed by m channel baseband signals in the ith transmit sweep cycle during a pth circular scan at a beam scan angle of $\theta_s$, a column vector of the matrix is a baseband signal of a m=1, 2, . . . , Mth channel, j represents an imaginary number unit, $\tilde{f}_R$ represents a beat-frequency estimated value corresponding to a distance of the inspected target or point, and $d_{rxm}$ (m=1, . . . , M) respectively represent distances between m receive antennas and the first receive antenna, wherein $d_{rx1}$=0, and $\lambda_c$ represents a wavelength corresponding to the linear-frequency-modulation continuous-wave center frequency; and a quantity i of transmit sweep cycles at each scan angle is equal to 1 or a positive integer greater than 1, and when the quantity is greater than 1, according to a requirement, the sequence element value $x(p,\theta_s,R)$ is an average or optimal value or another selected value of sequences of $x(p,\theta_s,R,iT_{sweep})$ in a plurality of transmit sweep cycle times in the current scan cycle.

6. The scanning method for measuring the microwave vibration and deformation according to claim 1, wherein the circular scan method in step S4 comprises the following steps:

according to a measurement requirement, sequentially changing the scan angle $\theta_s$ through the phase shift control, wherein s=0, 2, . . . , a positive integer of S−1, and according to the foregoing method, extracting vibration and deformation displacement element values of all targets or points for inspection in the scan range.

7. A scanning system for measuring microwave vibration and deformation applying the scanning method for measuring microwave vibration and deformation according to claim 1, the scanning system comprising:

a microwave transceiver configured to simultaneously transmit linear-frequency-modulation continuous-wave microwave signals of a plurality of channels by using a transmit antenna array, receive echo signals, output multi-channel baseband signals, and circularly scan a synthesized beam through phase shift control of transmit antennas;

a control processor configured to control beam scanning by microwave transceiver, baseband signal acquisition, and extraction on vibration and deformation displacement of inspected targets or points; and a display and storage module configured to display or store system scan angle distribution, vibration and deformation displacement sequence values or waveforms of all inspected targets or points, and other intermediate processing information.

8. The scanning system for measuring the microwave vibration and deformation according to claim 7, wherein the microwave transceiver comprises a linear-frequency-modulation continuous-wave microwave signal source, a power divider, a frequency mixer, a phase shifter, an amplifier, a transmit antenna array, and a receive antenna array, wherein the signal source is connected to the power divider, having part connected to the phase shifter and radiating signal through a transmit antenna and the other part being taken as a local oscillator signal for mixing; the phase shifter is connected to the transmit antenna and configured to make, through phase shift regulation, a main lobe of the synthesized beam transmitted by the transmit antenna array directed towards a specific set scan angle; and the receive antenna array is connected to the amplifier, an outputted amplified signal is connected to the frequency mixer, mixed with a local oscillator signal at the frequency mixer, so as to output multi-channel baseband signals.

9. The scanning system for measuring the microwave vibration and deformation according to claim 7, wherein the transmit antenna array is capable of being arranged horizontally, vertically, or both horizontally and vertically according to scanning requirements of a spatial attitude angle and a pitching angle; a quantity of transmit antennas in the transmit antenna array needs to be greater than or equal to 2, and the transmit antennas are arranged at equal or unequal spacing; and a quantity of receive antennas in the receive antenna array needs to be greater than or equal to 1 and the receive antennas are arranged at equal or unequal spacing; and a quantity of phase shifters is equal to the quantity of transmit antennas, and in addition to the phase shifter, a time delay line or another device with a phase shift control function is used for phase shift control.

10. The scanning system for measuring the microwave vibration and deformation according to claim 7, wherein the control processor comprises a scan control unit and a signal acquiring and processing unit, wherein the scan control unit is configured to control a phase shift of the transmit antenna channel, control a circular scan cycle, and control other conventional parameters of the microwave transceiver; and the phase shift control is implemented through configuration of the phase shifter connected to each transmit antenna; and the signal acquiring and processing unit is configured to synchronously acquire multi-channel baseband signals and process the acquired baseband signals to extract vibration and deformation displacement values of the inspected target or point.

11. The scanning system for measuring the microwave vibration and deformation according to claim 7, wherein in step S1, the performing phase shift control on transmit signals of the plurality of transmit antennas is completed through the following method:

if an angle of a target or point for inspection in a microwave front-end radiating wave is set to $\theta_0$, controlling phase shifts of antennas in the transmit antenna array respectively to be 0, $2\pi d_2 \sin\theta_0/\lambda_c$, ..., and $2\pi d_K \sin\theta_0/\lambda_c$, a first antenna being taken as a reference point, wherein $d_k$ (k=2, ... N) represents a distance between a $k^{th}$ transmit antenna and the first transmit antenna, and $\lambda_c$ represents a wavelength corresponding to a linear-frequency-modulation continuous-wave center frequency; and arranging the transmit antenna array at equal spacing or at unequal spacing sparsely, wherein the transmit antenna array is arranged horizontally during scanning at a horizontal angle, the transmit antenna array is arranged vertically during scanning at a pitching angle, and the transmit antenna array is arranged both horizontally and vertically during scanning at a spatial angle.

12. The scanning system for measuring the microwave vibration and deformation according to claim 7, wherein the scanning angle and distribution are determined according to a measurement requirement or a spatial arrangement of the point or target for inspection.

13. The scanning system for measuring the microwave vibration and deformation according to claim 7, wherein the scan angle direction required in steps S1 to S3 is obtained according to prior knowledge, the measurement requirement, or initial locating information of points for inspection in full field.

14. The scanning system for measuring the microwave vibration and deformation according to claim 7, wherein in steps S2 to S4, a non-linear demodulation method for extracting vibration and deformation displacement values of a single target, point for inspection, a plurality of targets, or points for inspection in a specific scan-cycle angle direction comprises the following steps:

calculating, by means of the following formula, a vibration and deformation displacement sequence element value $x(p,\theta_s,R)$, extracted through the non-linear demodulation method, of an inspected target or point in a current scan cycle:

$$x(p, \theta_s, R, iT_{sweep}) = \arg\left\{\sum_{m=1}^{M}\sum_{n=0}^{N-1} s_B(p, \theta_s, iT_{sweep}, nT_s)\exp[-j(2\pi \hat{f}_R nT_s)]\exp\left[-j\left(2\pi \frac{d_{rxm}\sin\theta_s}{\lambda_c}\right)\right]\right\} \lambda_c/4\pi$$

wherein $x(p,\theta_s,R,iT^{sweep})$ represents a displacement sequence element value of a target or point for inspection at a current scan angle distance of R during a pth circular scan with a beam scan angle of $\theta_s$ and a transmit sweep cycle of i, $T_{sweep}$ represents a sweep cycle of a transmit antenna transmitting a linear-frequency-modulation continuous wave, arg[•] represents calculation for a complex phase value, N represents a quantity of single-channel baseband signal elements in each sweep cycle, n represents a serial number of a single-channel baseband signal element in each sweep cycle, and $T_s$ represents a baseband signal sampling frequency time; and $s_B(p,\theta_s,iT,nT_s)$ represents a matrix formed by m channel baseband signals in the ith transmit sweep cycle during a pth circular scan at a beam scan angle of $\theta_s$, a column vector of the matrix is a baseband signal of a m=1, 2, ..., Mth channel, j represents an imaginary number unit, $\hat{f}_R$ represents a beat-frequency estimated value corresponding to a distance of the inspected target or point, and $d_{rxm}$ (m=1, ..., M) respectively represent distances between m receive antennas and the first receive antenna, wherein $d_{rx1}=0$, and $\lambda_c$ represents a wavelength corresponding to the linear-frequency-modulation continuous-wave center frequency; and a quantity i of transmit sweep cycles at each scan angle is equal to 1 or a positive integer greater than 1, and when the quantity is greater than 1, according to a requirement, the sequence element value $x(p,\theta_s,R)$ is an average or optimal value or another selected value of sequences of $x(p,\theta_s,R,iT_{sweep})$ in a plurality of transmit sweep cycle times in the current scan cycle.

15. The scanning system for measuring the microwave vibration and deformation according to claim 7, wherein the circular scan method in step S4 comprises the following steps:

according to a measurement requirement, sequentially changing the scan angle $\theta_s$ through the phase shift control, wherein s=0, 2, ..., a positive integer of S−1, and according to the foregoing method, extracting vibration and deformation displacement element values of all targets or points for inspection in the scan range.

\* \* \* \* \*